US007049960B2

(12) United States Patent
Waltermann

(10) Patent No.: US 7,049,960 B2
(45) Date of Patent: May 23, 2006

(54) METHOD AND SYSTEM FOR LOCATING OBJECTS

(75) Inventor: Rod David Waltermann, Rougemont, NC (US)

(73) Assignee: Lenovo (Singapore) Pte. Ltd, Central (SG)

(*) Notice: Subject to any disclaimer, the term of this patent is extended or adjusted under 35 U.S.C. 154(b) by 176 days.

(21) Appl. No.: 10/747,568

(22) Filed: Dec. 29, 2003

(65) Prior Publication Data

US 2005/0146433 A1 Jul. 7, 2005

(51) Int. Cl.
*G08B 13/14* (2006.01)
(52) U.S. Cl. .............................. 340/568.1; 340/572.1; 367/93; 367/95
(58) Field of Classification Search ............. 340/568.1, 340/572.1; 367/93, 95, 99
See application file for complete search history.

(56) References Cited

U.S. PATENT DOCUMENTS

| 5,535,176 | A | * | 7/1996 | Yang ........................... 367/13 |
| 6,161,434 | A | * | 12/2000 | Fink et al. .................... 73/587 |
| 6,515,588 | B1 | | 2/2003 | Sarabia .................... 340/568.1 |
| 6,755,083 | B1 | * | 6/2004 | Berryman .................... 73/602 |
| 2003/0063000 | A1 | | 4/2003 | Grimm .................... 340/568.7 |
| 2003/0067397 | A1 | | 4/2003 | Trimble ................. 340/825.49 |

FOREIGN PATENT DOCUMENTS

WO WO02096148 A1 11/2002

OTHER PUBLICATIONS

Fink et al., Acoustic time-reversal mirrors, 2001, IOP Publishing Ltd.*
Song et al., Demonstration of a High-Frequency Acoustic Barrier With a Time-Reversal Mirror, 2003, IEEE.*
Fink et al., Self Focusing Inhomogeneous Media With "Time Reversal" Acoustic Mirrors, 1989, IEEE.*
Ing et al., Surface and Sub-surface Flaws Detection Using Rayleigh Wave Time Reversal Mirros, 1995, IEEE.*

* cited by examiner

*Primary Examiner*—Thomas J. Mullen, Jr.
*Assistant Examiner*—Travis R. Hunnings
(74) *Attorney, Agent, or Firm*—Richard F. Frankeny; Winstead Sechrest & Minick P.C.; Scott W. Reid

(57) ABSTRACT

An area is established by positioning a string of boundary objects that are reflective to a range of ultrasonic frequencies. Tracking objects may be placed inside the area which also are reflective to the range of ultrasonic frequencies. An array of transducers insonify the area and the reflected signals are received by each transducer, digitized and stored as digital data. The digital data is read out in time reverse order and time reversal signals are generated that are coupled to each corresponding transducer. The time reversed signals focus energy on the reflective sources. The reflected signals resulting from the time reversed signals are analyzed to generate a reference signature indicating relative locations of boundary and tracking objects. The time reversed signals are sent intervals to generate new signatures which are compared to the reference signature to determine if tracking objects have been moved outside the area.

19 Claims, 9 Drawing Sheets

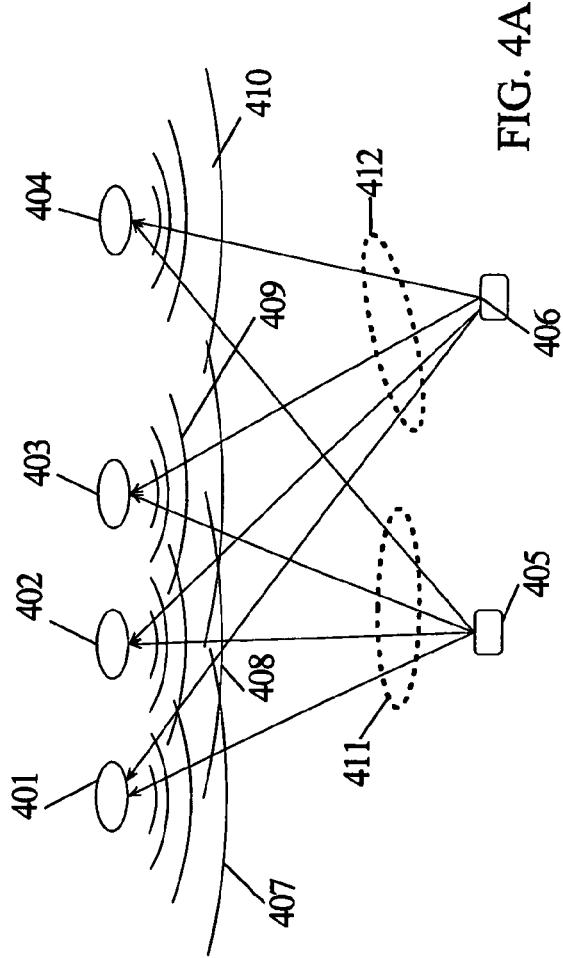
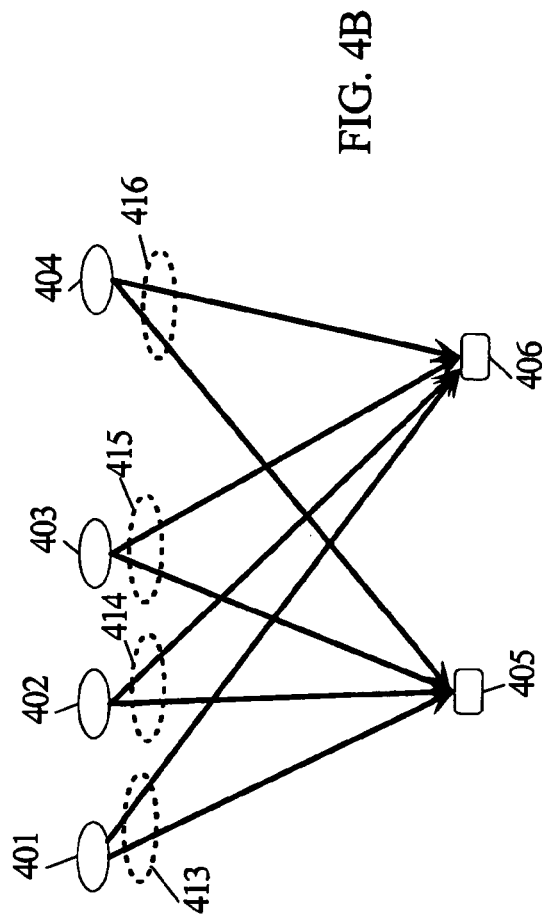
FIG. 4A
FIG. 4B

METHOD AND SYSTEM FOR LOCATING OBJECTS

TECHNICAL FIELD

The present invention relates in general to methods and systems for automatically detecting when an object is moved from a location defined by a boundary.

BACKGROUND INFORMATION

Presently, stores and other businesses that want to ensure that assets are not removed from a particular site must attach a sensor tag to the asset. If the asset has authorization to be removed, then the sensor tag is removed by an authorized personnel. Sensors are employed at a point of egress so that assets which do not have the sensor tag removed will set off an alarm indicating that the asset is being removed without authorization. These prior art systems employ a boundary gate. Stores apply sensor tags to each piece of merchandise. When the merchandise is bought, a store clerk removes the sensor tag with a tool designed specifically for the task. If the tag is not removed, a sensor at a point of egress will set off an alarm indicating that a piece of merchandise has been taken across the boundary gate (most likely without being purchased).

This process requires each piece of merchandise to be tagged and also requires the merchandise to pass through a particular boundary gate to ensure detection of unauthorized removal. While this process may be effective in detecting unauthorized removal of an object through the boundary gate, it does not help one locate an object that has moved and does not easily allow detection when an object passes an arbitrary closed boundary.

There is, therefore, a need for a method and system for assigning an object to a bounded selected area and detecting when the object has been removed across any boundary line of the selected area.

SUMMARY OF THE INVENTION

An area is defined by a set of boundary objects that are designed to be reflective to acoustic energy of a specific frequency range. Likewise, tracking objects placed within the area incorporate a tag that is likewise reflective to the acoustic energy in the specific frequency range. An array of ultrasonic transducers for broadcasting and receiving acoustic energy are arranged so that they focus on an area of interest where one or more tracking objects have been placed. The area is subjected to a pulse of ultrasonic energy from the array of ultrasonic transducers. The transducers are then switched to the receive mode and reflected ultrasonic energy from the area is received and digitized by signal processing circuitry associated with each transducer. The resulting data is stored in time sequence by a memory associated with each transducer. The stored ultrasonic signals are then read out in reverse time order and converted back to signals using a digital to analog converter, amplified, and broadcast back to the area of interest. The time reversed signals focus back to the source from which they emanated. This causes the boundary objects and tracking objects to reflect back signals in an enhanced manner. These reflected signals are again received by the transducers digitized and stored in memory. A processor analyzes the signals from each transducer and creates a reference spatial signature of the boundary objects and the tracking objects. The time reversed signals are then broadcast at regular intervals and new spatial signatures are generated after each broadcast. The new spatial signatures are compared to the reference signature. If the processor detects that a tracking object has moved or crossed the boundary defined by the boundary objects without authorization, an alarm signal may be generated.

In another embodiment, the boundary objects and tracking objects are active. Each boundary object and tracking object has a transmitter for sending signals when stimulated in a predetermined manner. An array of ultrasonic transducers for broadcasting and receiving acoustic energy are arranged so that they focus on an area of interest where one or more tracking objects have been placed. The area is subjected to a pulse of ultrasonic energy from the array of ultrasonic transducers. The transducers are then switched to the receive mode and reflected ultrasonic energy from the area is received and digitized by signal processing circuitry associated with each transducer. The resulting data is stored in time sequence by a memory associated with each transducer. The stored ultrasonic signals are then read out in reverse time order and converted back to signals using a digital to analog converter, amplified, and broadcast back to the area of interest. The time reversed signals focus back to the source from which they emanated. This causes the boundary objects and tracking objects to reflect back signals in an enhanced manner. These reflected signals are again received by the transducers digitized and stored in memory as second received data. The second received data are then read out in reverse time order and converted back to second signals using a digital to analog converter, amplified, and broadcast as second acoustic signals back to the area of interest further enhancing the focus of transmitted signals to the reflective sources. The active boundary objects and tracking objects have threshold circuitry that determines if the time reversed second acoustic signals impinging on each object exceeds a predetermined threshold. The threshold may be set so that only those objects that remain at their locations receive sufficient acoustic signal to exceed the threshold. The boundary objects are fixed, therefore they should always receive second acoustic signals above the predetermined threshold. However, if a tracking object is moved it will not receive sufficient second acoustic signal as the second acoustic signals are focused as a result of their time reverse generation. Circuitry in the boundary objects and the tracking objects signal their transmitter to send an identification signal if the threshold for the received second acoustic signal is exceeded. The identification signals are received and a signature may be generated indicating a relative location of tracking objects and boundary objects defining the boundary of the area. If it is determined that a tracking object has been moved across the boundary without authorization, then an alarm may be triggered.

A tracking object may fail to send an identification signal if it has been moved within the area or has been moved outside the area. By sending out the second acoustic signals at regular intervals, the new signatures may be generated by transmitted identification signals. The identification signals, when triggered, emanate from each stimulated tracking object. The tracking objects may have additional circuitry for decoding received signals, for example, with a particular binary sequence. When a tracking object is stimulated with a sufficient level of the second acoustic signal, it will transmit an identification signal which is received by the transducers. When the identification signals are time reversed and transmitted, the tracking objects will receive focused acoustic signals. The time reversed identification signals may then be transmitted at encoded time intervals wherein the circuitry in a particular tracking object may determine that it is being interrogated. Decoding the time sequence of received identification signals may be used to disable a tracking object or communicate other information. If the system is notified that a particular tracking object is authorized to move across the boundary, then the system may use this technique to disable the tracking object so that it no longer registers when the signature patterns are generated.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4A illustrates a plurality of transducers with acoustic patterns of transmitted and received sound waves from a plurality of reflective objects;

FIG. 4B illustrates transmitted and received acoustic patterns when the received signals from FIG. 4A are rebroadcast in time reversed order;

DETAILED DESCRIPTION

Figure 1:
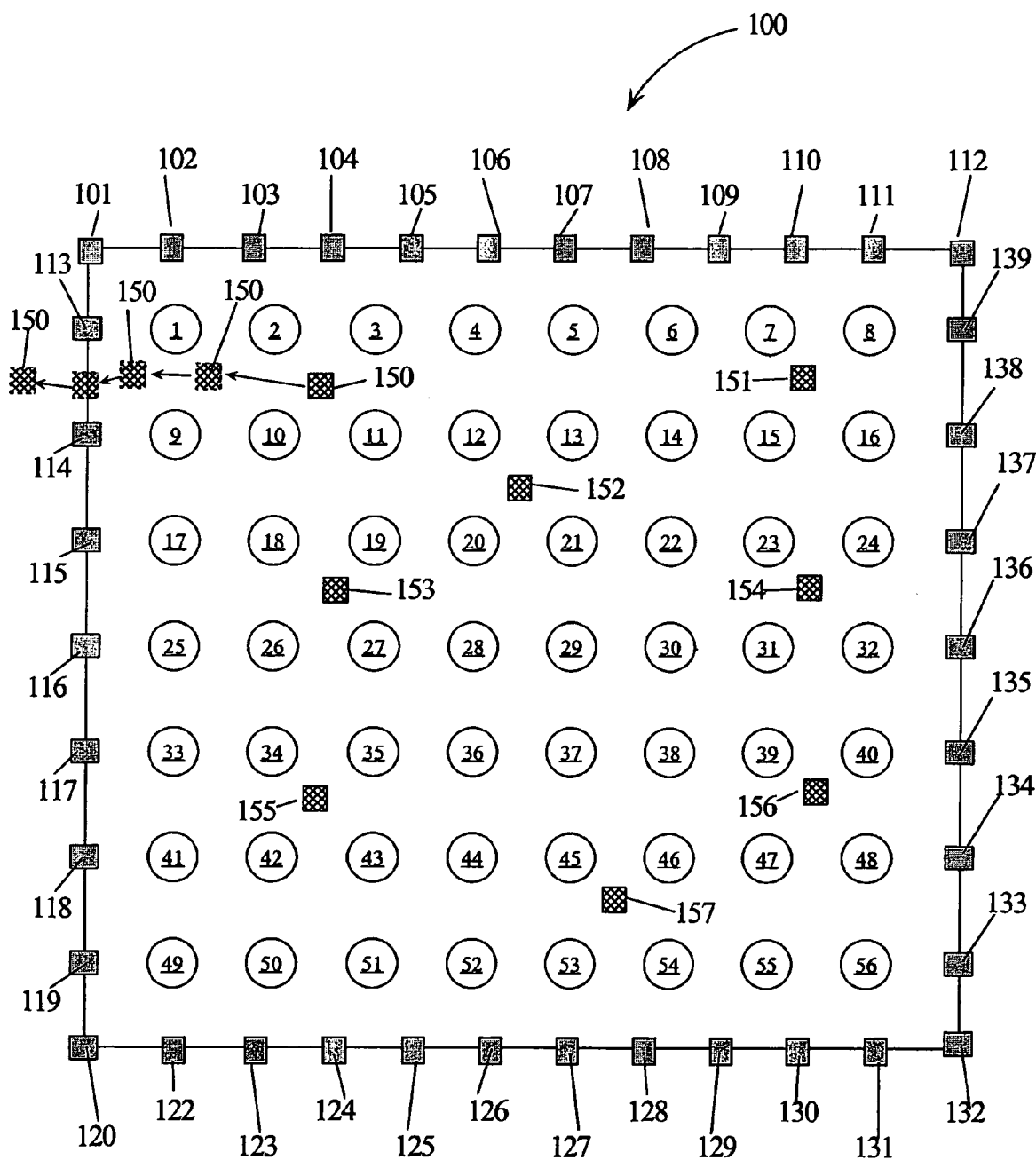
FIG. 1 is a diagram illustrating an array of transducers, a boundary defined by boundary objects and a plurality of tracking objects.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The time reversal mirror (TRM) technique was originally developed by M. Fink in France using ultrasound in air. TRMs have numerous applications in medicine, non-destructive testing, and presently in underwater acoustics. The theory behind a TRM relies on the simple principle that the linear wave equation that determines the propagation of acoustic signals through a medium is a second order differential equation in time and space. An acoustic wave propagating in an inhomogeneous and lossless fluid medium with acoustic velocity, may be described by the pressure field, where distance (r) and time (t) are the space and time coordinates. The pressure field satisfies the wave equation which is invariant under time reversal. If the space and the time coordinates are reversed, the equation remains the same. Simply put, if an acoustic signal propagates through a medium, from left to right, and it is time reversed (reverse time) then the signal will travel back, right to left, following the same path back. A TRM, also referred to as the process of phase conjugation (PC), focuses sound from a source-receive array (SRA) back to the probe source (PS) which insonified (radiated with pulses of acoustic energy) the SRA.

The SRA receives the probe source pulse field, time-reverses it and then retransmits it back towards the PS. If the ocean environment does not change significantly during the two-way travel time, the phase conjugate field will refocus regardless of the complexity of the medium with the caveat that excessive loss in the system degrades the process.

TRM technology is akin to descending into an Alice-in-Wonderland canyon where the echo that returns when you shout "hello" sounds like "olleh." No such sound-reversal canyons exist in nature. However, physicists in Europe and the United States have recently been creating environments in the laboratory and underwater that exhibit reversed echoing. Instead of actual walls, from which only run-of-the-mill echoes would reflect, the researchers direct their sounds to computerized microphone-loudspeaker units that return them in a time-reversed order—the last sound component to arrive is the first to be sent back. Such setups refocus sound with remarkable precision. When a person sings out "hello" in such an environment, the sound not only comes back reversed but it also beams specifically to the vocalist's head—and nowhere else.

When an acoustic mirror picks up a sound pulse and its reverberations, each transducer converts vibrations into electric signals and loads them into its memory in time-reversed order. To create the echo, all the transducers reissue signals as sounds aimed back in the direction from which they came. This is akin to undoing the wave action that follows when you drop a pebble into a pond, as if the ripples in the pond collapse back onto the pebble.

Time reversal of ultrasonic fields represents a way to focus through an inhomogeneous medium. This may be accomplished by a TRM made from an array of transmit-receive transducers that respond linearly and allow the incident acoustic pressure to be sampled. The pressure field is then time-reversed and re-emitted. This process can be used to focus through inhomogeneous media on a reflective target that behaves as an acoustic source after being insonified (illuminating with short pulses of ultrasonic sound). The time-reversal approach is introduced in a discussion of the classical techniques used for focusing pulsed waves through inhomogeneous media (adaptive time-delay techniques). Pulsed wave time-reversal focusing is shown using reciprocity valid in inhomogeneous medium to be optimal in the sense that it realizes the spatial-temporal matched filter to the inhomogeneous propagation transfer function between the array and the target. The research on time-reversed wave fields has also led to the development of new concepts that are described: time-reversal cavity that extends the concept of the TRM, and iterative time-reversal processing for automatic sorting of targets according to their reflectivity and resonating of extended targets.

The first TRM systems comprised an array of piezoelectric transducers. Each transducer connected to an electronic chain including an amplifier and an analog-to-digital converter. The sound signals picked up by the transducer travel through the chain and are stored in the memories. The signals are then reversed by reading the memories backwards and a "time-reversed" wave is reconstituted. Unlike optical mirrors where imaginary projections of reflected light rays converge on the vanishing point, the beams do converge on a point in time-reversing mirrors.

Figure 2:
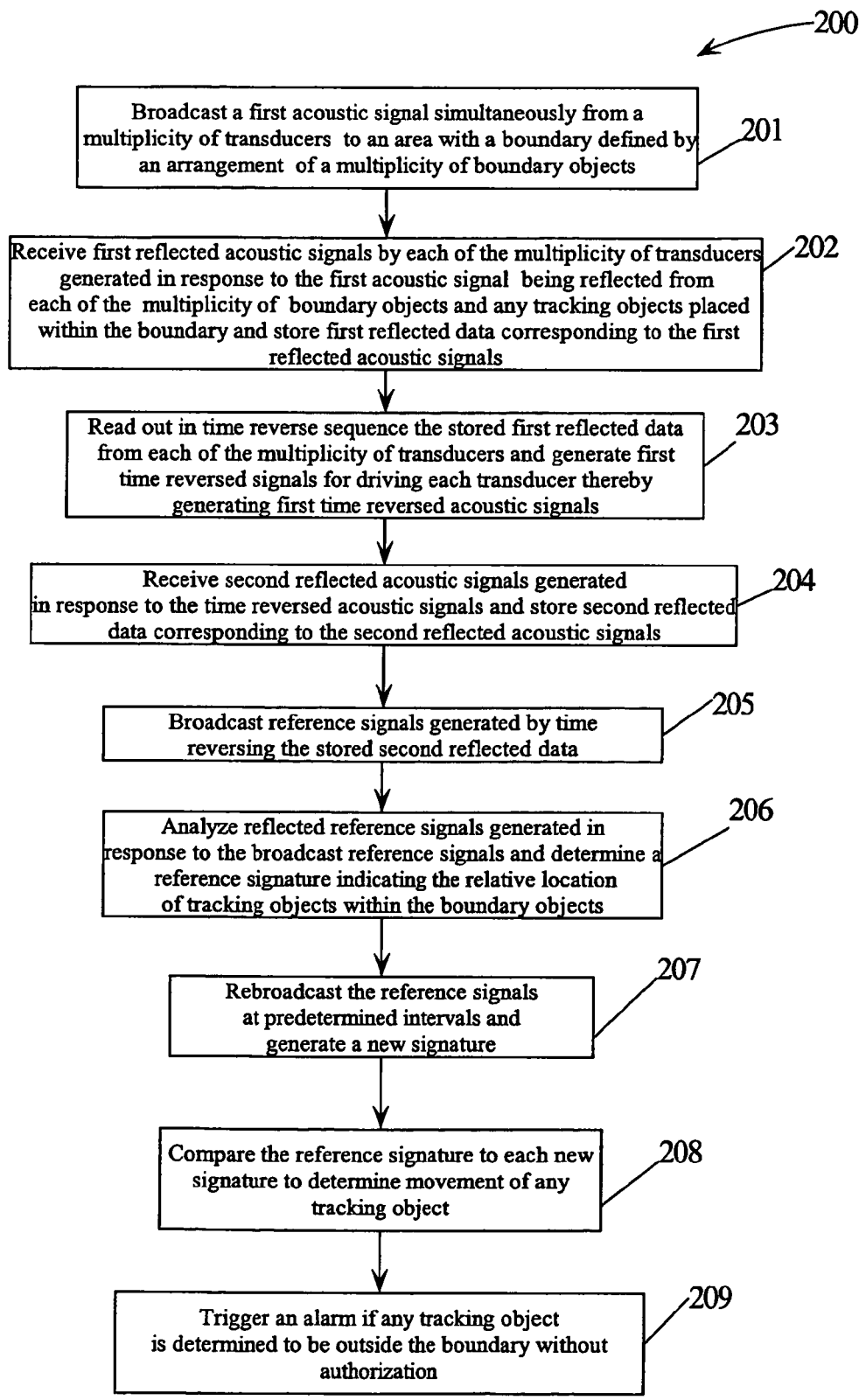
FIG. 2 is a flow diagram of method steps used in embodiments of the present invention.

FIG. 2 is a flow diagram of method steps 200 used in embodiments of the present invention wherein TRM is used to make a security system for detecting when a tracking object has been moved within or removed from a predetermined area. In step 201, a first signal is broadcast simultaneously from multiple transducers (generally preferable reflective to particular acoustic frequencies) arranged in an array proximate to a boundary determined by boundary objects. For example, the boundary objects may be made of a shape and size such that they are quasi-resonant at a particular ultrasonic frequency range. In step 202, reflected acoustic signals from the boundary objects and any tracking objects placed in the area are digitized by an analog to digital (A/D) converter. The tracking objects are fitted with a tag that is likewise reflective at the particular ultrasonic frequency range. The digitized signals from each transducer are stored in time sequence. In step 203, the stored data for each transducer is time reversed and applied to a digital to analog (D/A) converter, amplified, and rebroadcast. The time reversed signals refocus by nature of the TRM effect such that they impinge back to the source from which they were originally generated. The time reversal signals become precisely directed back to boundary and tracking objects that remain at their original location.

At this point, the acoustic time reversed signals impinge on desired points (tracking objects and boundary objects), the reflected signals will now have higher energy since they are focused precisely on the objects. In step 204, the reflective signals from the rebroadcast of the time reversed signals are digitized by signal processing circuitry associated with each transducer and then stored in a memory. In step 205, the stored data is analyzed and a reference signature is determined indicating a relative location of the tracking objects and the boundary objects. In step 206, the signals used to generate the reference signature are rebroadcast at regular intervals and new signatures are generated. In step 207, the new signatures are compared with the reference signature to determine if tracking objects have been moved. In step 208, an alarm is triggered if a tracking object is determined to have been moved outside the boundary without authorization. In step 209 an alarm is triggered if any tracking object is determined to be outside the boundary without authorization.

Figure 3:
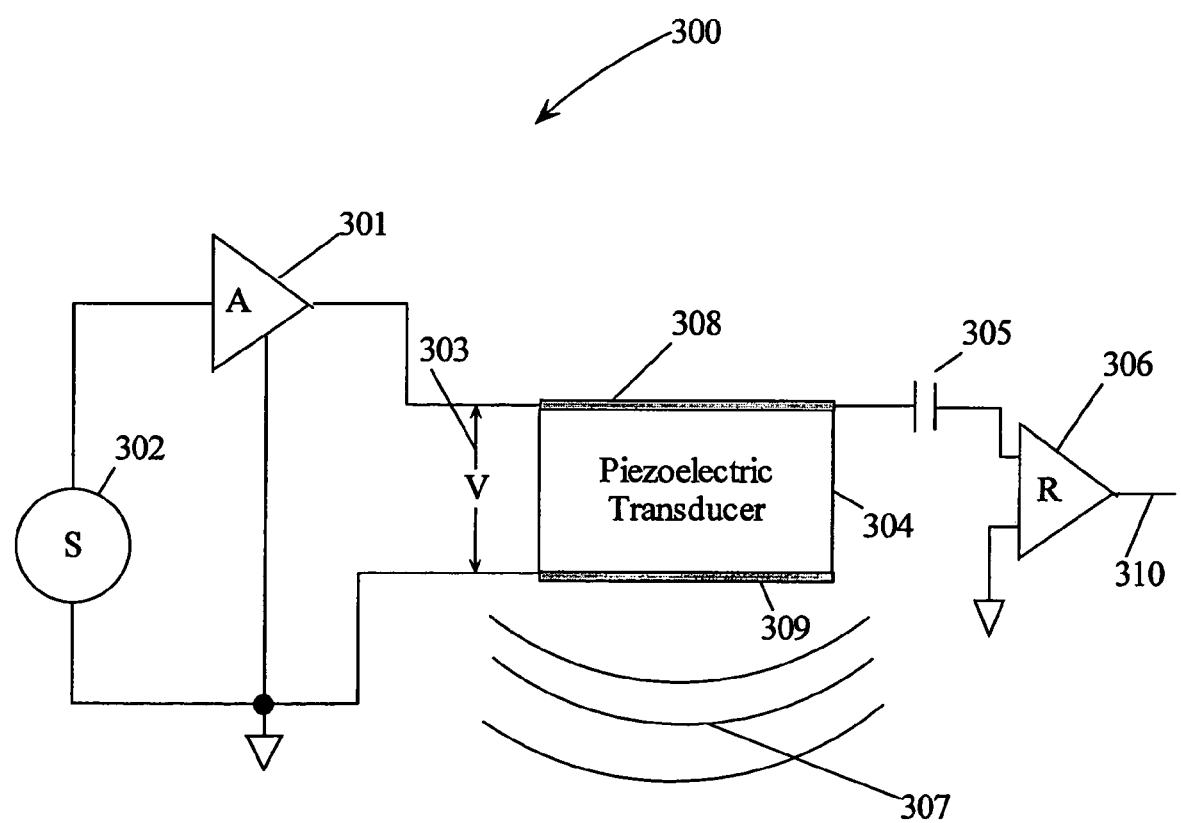
FIG. 3 is a circuit diagram of a piezoelectric transducer and corresponding driver and receiver.

FIG. 3 is a simple circuit diagram of a piezoelectric transducer system 300 that may be used with embodiments of the present invention. A piezoelectric transducer 304 is a device that has contacts 308 and 309 placed on opposing surfaces. In this manner, when a voltage is placed across these contacts, the transducer crystal compresses or expands depending on the polarity of the voltage. If the voltage is time varying, then the moving surfaces of the contacts (and the crystal) will generate an acoustic pressure wave and piezoelectric transducer 304 becomes an acoustic transmitter. Likewise, when piezoelectric transducer 304 is subjected to an incoming pressure wave, the compression or expansion of the crystal generates a voltage across the contacts. This voltage signal is coupled with capacitor 305 to receiver amplifier 306 which generates an amplified signal at output 310 that represents the amplitude and frequency information regarding the received acoustic wave. When signal 302 is amplified by amplifier 301 and coupled as voltage 303, piezoelectric transducer 304 generates acoustic energy 307.

FIG. 4A is a graphical depiction of transducers 401–404 broadcasting acoustic energy 407–410. When the acoustic energy is the result of driving transducers 401–404 with the same signal, similar acoustic waves are generated. The acoustic energy 407–410 disperses an acoustic energy of different amplitude and phase arrives at the objects 405 and 406 from each source. Object 405 reflects energy back to the sources represented by vectors 411. Object 406 reflects energy back to the sources represented by vectors 412.

FIG. 4B illustrates the result of using time reversal broadcast. When the reflected acoustic energy represented by vectors 411 and 412 in FIG. 4A are received at the respective transducers 401–404, the transducers generate electrical signals that are representative of the reflected acoustic energy amplitude and phase. These signals are digitized (A/D) (not shown in FIG. 4B) and stored in time sequence in a memory (not shown in this view) associated with each transducer 401–404. The stored data is time reversed and converted back to electrical signals using D/A converters (not shown in FIG. 4B). These time reversed signals now broadcast from transducers 401–404 as focused vectors 413–416, respectively. By using the technology of TRM, the transducers 401–404 focus acoustic energy back to the source from which the reflected energy emanated.

Figure 5:
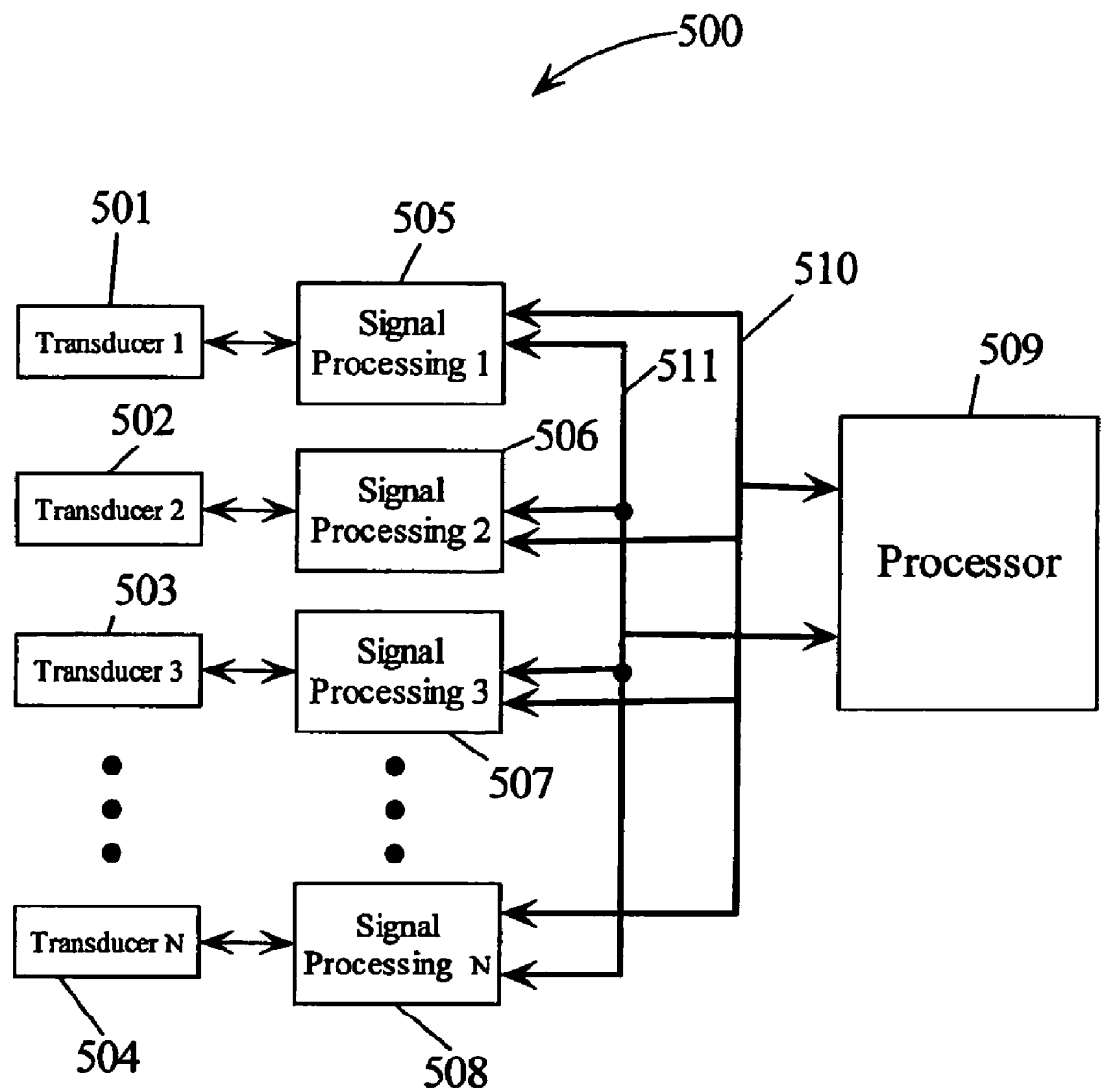
FIG. 5 is a block diagram of multiple transducers, signal processing circuitry, and a processor according to embodiments of the present invention.

FIG. 5 is a block diagram 500 illustrating multiple transducers 501–504 coupled to corresponding signal processing circuitry 505–508. The signal processing circuitry 505–508 are coupled to processor 509 using a data bus 510. In this manner, data for generating the reference signals may be loaded into memories (see FIG 6) in signal processing circuitry 505–508. Likewise, stored data may be sent to processor 509 for analysis. Processor 509 also communicates with controllers in each of the signal processing circuitry 505–508 using control bus 511.

Figure 6:
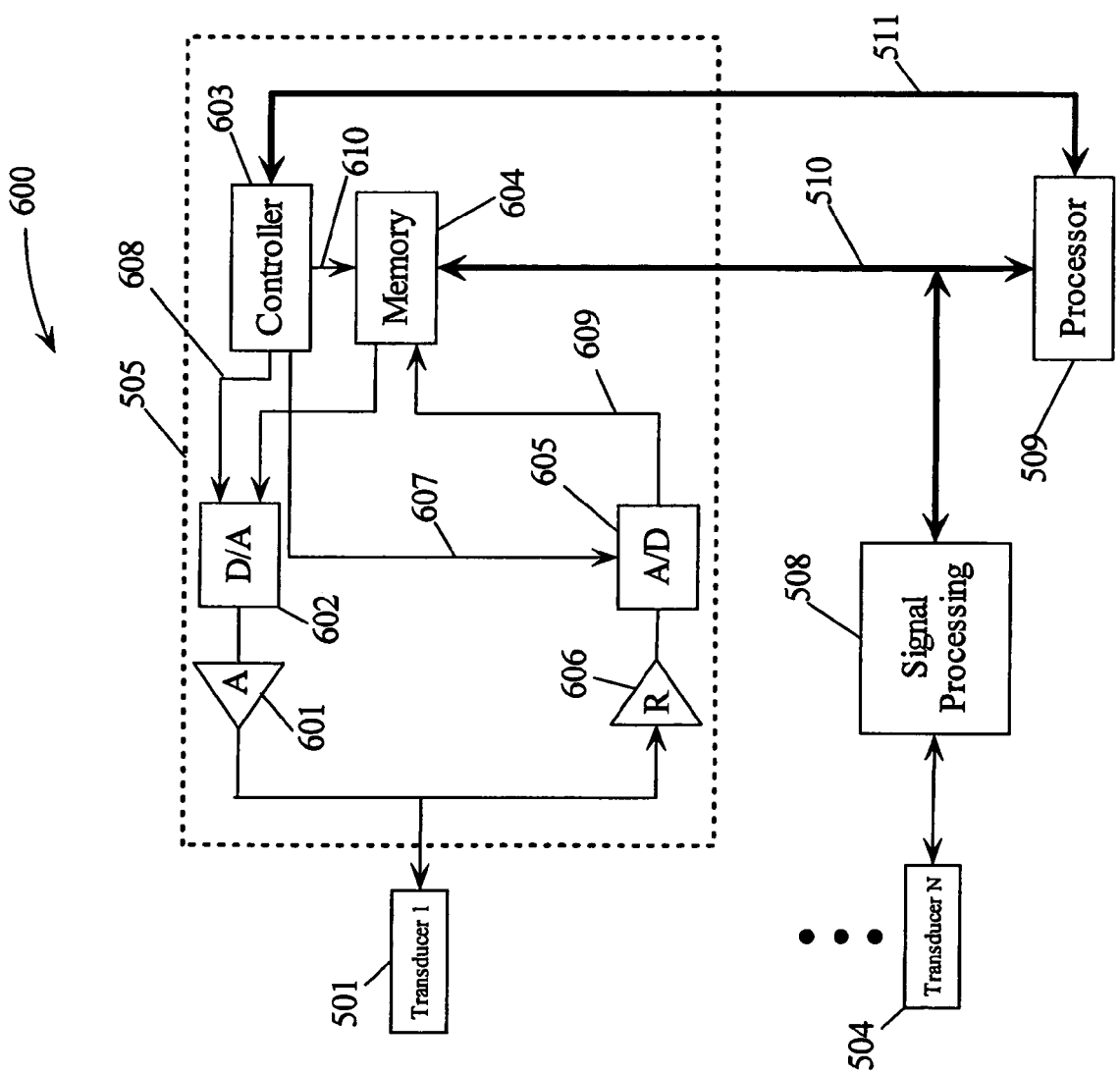
FIG. 6 is a circuit block diagram showing details of the circuitry in signal processing circuitry for embodiments of the present invention.

FIG. 6 is a circuit diagram 600 illustrating details of circuitry in each of the signal processing circuitry 505–508. Exemplary signal processing circuitry 505 is shown in detail. Transducer 501 is coupled to both driving amplifier 601 and receiving amplifier 606. Memory 604 may be loaded initially with data for generating a reference signal. Controller 603 issues timed read commands to memory 604 to read out the digital data 608 at the desired data rate. D/A converter 602 converts the digital data to an analog signal which is amplified by driving amplifier 601 exciting transducer 501. When the reference signal is being sent, all transducers 501–504 are driven by the identical signal. Controller 603 is used to enable D/A 602 and A/D 605 with control signals 608 and 607 respectively. When a reflected signal is received, receiving amplifier 606 amplifies the signal and it is digitized by A/D 605 generating digital data 609. Exemplary memory 604 stores the digital data 606 under control of controller 603 via control signals 610. Processor 509 communicates with controllers (e.g., controller 603) on control bus 511. Likewise, processor sends and receives data from memories (e.g., memory 604) on data bus 510. Processor 509 may run software routines that coordinate the sending of control data on control bus 511 and the receiving and sending of data on data bus 510. The software routines facilitate generation of reference signatures from an array of transducers 501–504 and generating and comparing new signatures to the reference signature necessary to determine if tracking objects are moved from an area covered by transducers 501–504 according to embodiments of the present invention.

FIG. 1 is a diagram illustrating an array 100 of transducers 1–56 used to cover an area defined by boundary objects 101–120 and 122–139. The signal processing circuitry (e.g., 505), processor 509, and the data and control bus are not shown in this illustration for simplification. Transducers 1–56 are driven by the same signal to generate the first signal reflections. Boundary objects 101–120 and 122–139 would reflect acoustic energy and naturally the transducers closest to specific boundary objects would receive the most reflected energy from those objects. For example, transducer 1 would receive the most reflected energy from boundary objects 101–103 and 113–114. Tracking objects 150–157 are shown positioned in desired locations within the area defined by the boundary objects 101–120 and 122–139. The positions of the tracking objects 150–157 are arbitrary and are shown only to explain operation of embodiments of the present invention. When transducers 1–56 send out the first signal, they receive reflected energy that is digitized by each signal processing circuitry (e.g., 505) and stored in a corresponding memory (e.g., 604). A controller for a specific transducer (e.g., controller 606) is used to read out the stored data in time reverse sequence at a desired rate (e.g., to generate a desired frequency). The time reversed signals from each transducer 1–56 focus back to the reflecting source from which they were generated. Since boundary objects 101–120 and 122–139 and tracking objects 150–157 are preferable reflective, most of the time reversed energy will be directed to these objects. The reflections that result from the time reversed signals now appear to be generated by point sources. The data resulting from the time reversed signals is again digitized and stored in the memories (e.g., memory 604). This data is sent to processor 509 which analyzes all the data from transducers 1–56 and generates reference signature indicating relative positions of all the reflective sources (boundary objects 101–120 and 122–139 and tracking objects 150–157). Signatures may be generated by various types of analysis of signals received at transducers 1–56. For example, the boundary objects 102-111 are closest to corresponding transducers 1–8 and these transducers would naturally receive a larger reflected signal from these transducers than would transducers more to the center of the array (e.g., transducers 19–21). Likewise, exemplary transducers 7, 8, 15, and 16 would receive a larger reflected signal from tracking object 151 than transducers 6 and 14. Analysis based on received signal levels by various transducers would be one way to differentiate patterns signifying the location of boundary objects as well as tracking objects relative to the array of transducers 1–56. Other analysis methods would also work and are considered within the scope of the present invention.

When a tracking object 150–157 is moved, the first time reversed signal will not impinge on the moved tracking object and thus the amount of reflected signal received by various transducers (e.g., 101–139) will differ from the levels received when the reference signature was generated. By comparing a new signature with the reference signature, the move tracking object (e.g., 150) may be identified. At this time, a reference signature may be again generated as before. This allows the moved tracking object to be located. If the tracking object remains within the boundary defined by the boundary objects, then monitoring would continue.

In FIG. 1, tracking object 150 is shown to be moved from a position inside the boundary defined by boundary objects 101–139 to a position outside this boundary. Since time reversed signals for each transducer 1–56 are sent at regular intervals and new signatures are generated, software in processor 509 is able to track the position of tracking object 150 by analyzing difference in generated signatures. If tracking object 150 is moved outside the boundary set by boundary objects 101–139 without authorization (supplied to processor 509) then an alarm signal may be generated.

The boundary objects 101–139 are shown in FIG. 1 arranged in a square pattern. This arrangement is only an example arrangement of the boundary objects. One of ordinary skill in the art will realize that other arrangements of boundary objects that may be used to sufficiently define an area are within the scope of the present invention.

In one embodiment of the present invention, boundary and tracking objects may be passive in the sense that they are only fitted with means for reflecting acoustic energy in a frequency range. In another embodiment of the present invention, boundary and tracking objects may be active such that they transmit an identification signal when they are interrogated with an acoustic signal of sufficient strength. In this case, the time reversed signals are generated that are naturally configured to be focused to boundary objects and to tracking objects. If the time reversed signals are generated when the boundary objects and the tracking objects are in a reference state, then a rebroadcast of the time reverse signals will stimulate the objects with focused energy so that they will receive sufficient energy to trigger a generation of the identification signal. If a tracking object is moved, or temporarily shielded, then the rebroadcast of the time reverse signal will miss the object and it will not transmit an identification signal. This may be used to signal the processor to regenerate a reference signature and rebroadcast a new reference pattern. The array of transducers are arranged such that they do not broadcast with sufficient signal strength to objects outside of the boundary. Therefore, rebroadcast of the new time reversed signals will trigger the moved tracking object to send its identification signal unless it is not within the area. In this case, an alarm may be signaled if the tracking object has been moved outside the area without authorization.

Figure 7:
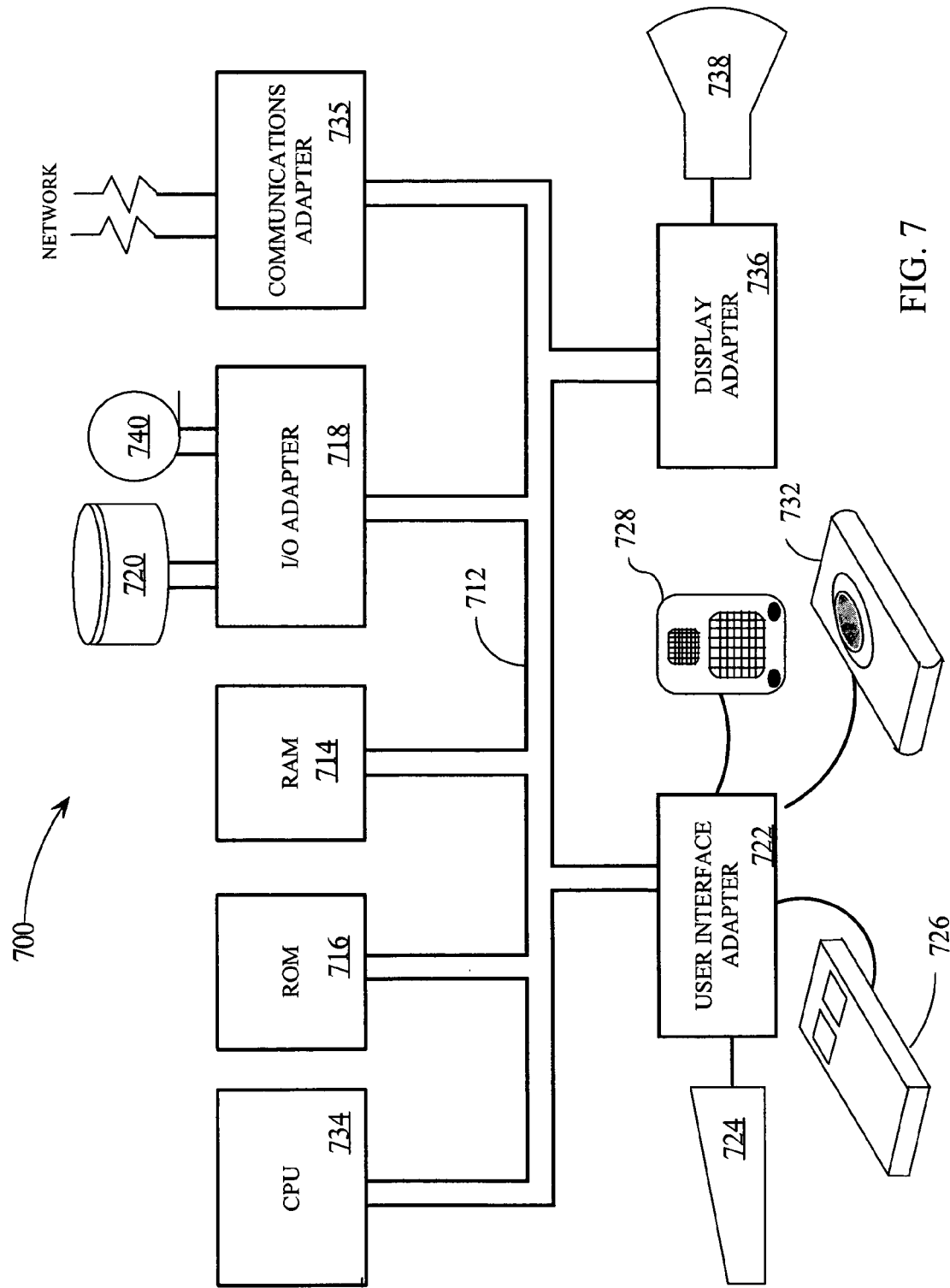
FIG. 7 is a block diagram of a data processing system suitable for practicing embodiments of the present invention.

A representative hardware environment for practicing the present invention is depicted in FIG. 7, which illustrates a typical hardware configuration of a data processing system 700 in accordance with the subject invention having central processing unit (CPU) 734 coupled to an array of transducer systems generating digital data from received acoustic signals. The transducer systems may be coupled to CPU 734 via system bus 712 or with a switch network (not shown) where multiple signals are processed in parallel. The data processing system 700 shown in FIG. 7 includes random access memory (RAM) 714 for storing programs and transducer data, read only memory (ROM) 716, and input/output (I/O) adapter 718 for connecting peripheral devices such as disk units 720 and tape drives 740 to bus 712, user interface adapter 722 for connecting keyboard 724, mouse 726, speaker 728, microphone 732, and/or other user interface devices such as a touch screen device (not shown) to bus 712, communication adapter 735 for connecting the workstation to a data processing network, and display adapter 736 for connecting bus 712 to display device 738. Keyboard 724 may be used to input commands to switch an operator from monitoring one area to monitoring another area using embodiments of the present invention. Transducer data may be provided to the CPU 734 from various areas for processing. Display device may be used to display location signatures defining an area being monitored according to embodiments of the present invention. An operator may use keyboard 724 to enter an alarm code if a tracking object moves outside a defined area or CPU 734 may automatically generate an alarm if a tracking object is moved outside a boundary defined by boundary objects.

Figure 8:
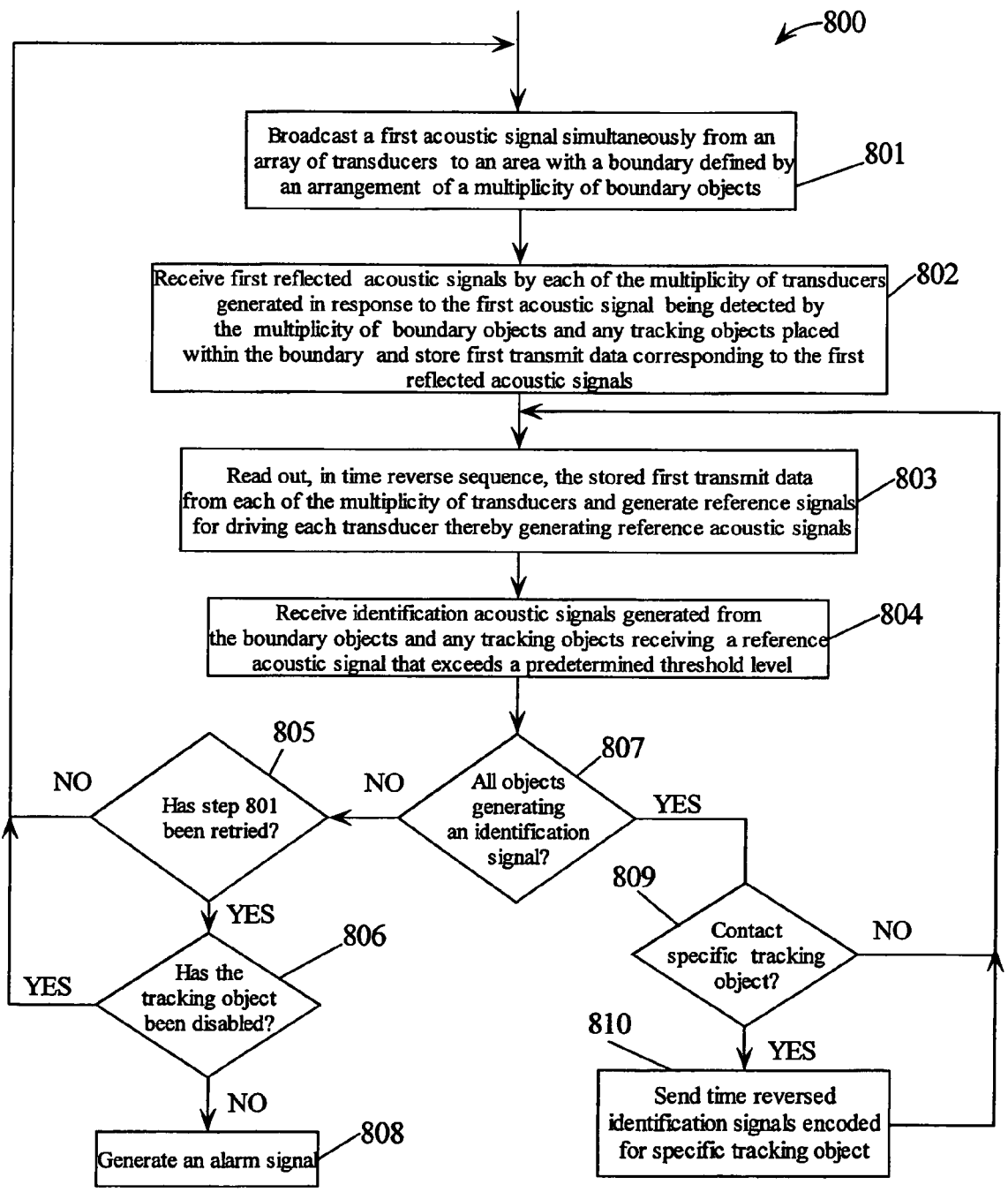
FIG. 8 is a flow diagram of method steps used in an embodiment of the present invention.

FIG. 8 is a flow diagram 800 of method steps used in other embodiments of the present invention. In step 801, a first acoustic signal is transmitted simultaneously by an array of transducers to a selected area defined by an arrangement of multiple boundary objects. In step 802, first reflected acoustic signals from the boundary objects and any tracking objects within the selected area are received by each transducer. The first reflected acoustic signals are stored as first transmit data associated with each corresponding transducer. In step 803, the first transmit data is read out of storage in time reverse sequence and reference signals are generated for driving each transducer thereby generating reference acoustic signals. In step 804, identification acoustic signals generated from the boundary objects and any tracking objects receiving a reference acoustic signal with a level exceeding a predetermined threshold value are received by the transducers. In step 807, a determination is made by analyzing data corresponding to the received identification acoustic signals whether all objects are generating identification signals. If all objects are not generating identification signals, then in step 805 a test is done to determine if a tracking object not generating an identification signal has been moved to a location within the area or to a location outside the area. If the result of the test in step 805 is NO, then a branch is taken to step 801 to repeat steps 801 through 807. If the result of the test in step 805 is YES, then the object is either moved outside the area or it has been disabled. In step 806, a test is done to determine if the tracking object has been disabled. If the result of the test in step 806 is YES, then a branch is taken back to step 801 to repeat steps 801 through 807 without the disabled tracking object as a expected source of identification signals. If the result of the test in step 806 is NO, then in step 808 an alarm signal is generated indicating a tracking object has been moved outside the area without authorization.

If the result of the test in step 807 is YES, then all tracking objects are responding with identification signals when interrogated by the reference acoustic signals. Additional options are available wherein the received identification signals may also be time reversed to generate focused signals for the tracking objects and possibly for boundary objects. For example, the system may be notified that a particular tracking object is authorized to move outside the boundary area. In this case, it may be desirable to disable the tracking object such that it not longer generates a reference signal when stimulated or it may be desirable to switch the tracking object to an OFF state. The identification signals received by the transducers may also be digitized and stored. When the identification signals are time reversed, they strongly focus back to their source; tracking objects and boundary objects. If time reversed identification signals are transmitted in an encoded time sequence, the resulting signals may be used to form a serial data stream that may be decoded with circuitry in the tracking objects. For example, the tracking objects may have circuitry for detecting a broadcast serial address. In this manner, the time reversed identification signals may be encoded so that specific tracking objects may be disabled or otherwise receive programming or modification data. In step 809 a test is done to determine if a specific tracking object needs to be contacted. If the result of the test in step 809 is NO, then a branch is taken back to step 803 to send the reference acoustic signals to determine if tracking objects have been moved. If the result of the test in step 809 is YES, then in step 810 time reversed identification signals are encoded and sent to contact the specific tracking object. A branch is then taken back to step 803.

In another embodiment of the present invention, it may be desirable to contact a specific tracking object when it is determined that the tracking object is in the process of being moved. Since the identification signals may be used to generate signatures identifying relative locations of boundary objects and tracking objects, then repeatedly generating these signatures would enable an operator to determine that an object is moving. Using the feature in step 810, a specific tracking object may be sent a code triggering it to transmit an alarm signal that would direct security personnel to the location of the tracking object so that it may be intercepted.

Figure 9:
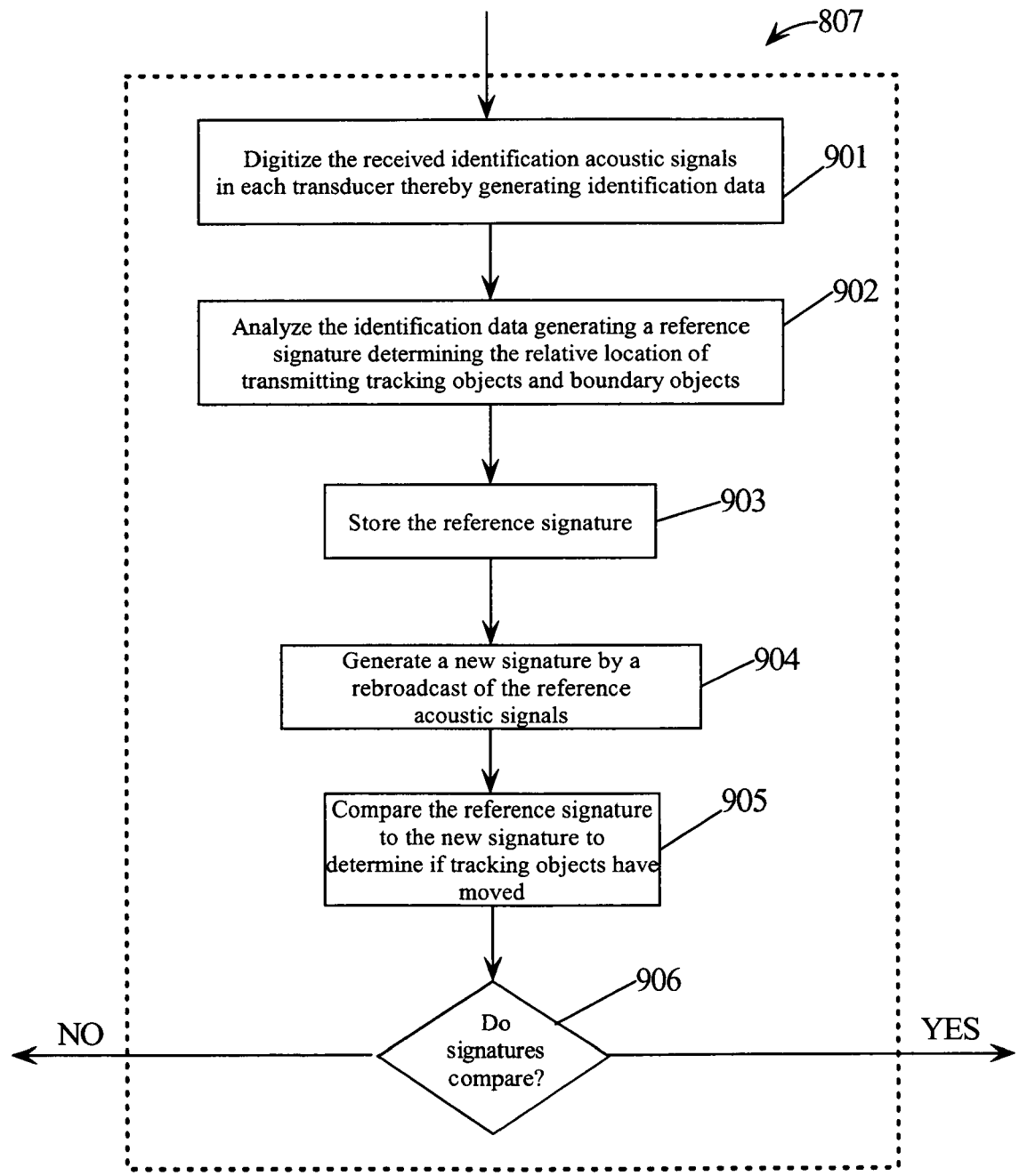
FIG. 9 is a flow diagram detailing steps within a step 807 of FIG. 8.

FIG. 9 is a flow diagram of method steps contained in step 807 of FIG. 8 for determining if all objects are generating an identification signal. In step 901, the received identification signals in each transducer are digitized to generate identification data. In step 902, the identification data is analyzed and a reference signature is generated determining the relative location of the boundary objects and the tracking objects. In step 903, the reference signature is stored. In step 904, a new signature is generated by a rebroadcast of the reference acoustic signals. In step 905, the reference signature and the new signature are compared to determine if tracking objects have moved (are not broadcasting identification signals). In step 906, a test is done to determine if the signatures compare. If the result of the test in step 906 is YES, the YES branch of step 807 is taken. If the result of the test in step 906 is NO, then the NO branch of step 807 is taken.

Although the present invention and its advantages have been described in detail, it should be understood that various changes, substitutions and alterations can be made herein without departing from the spirit and scope of the invention as defined by the appended claims.

What is claimed is:

1. A method for determining if a tracking object is within a selected area comprising the steps of:
  a) transmitting a first acoustic signal simultaneously from an array of transducers proximate to the selected area;
  b) receiving first reflected signals, generated in response to the first acoustic signal, in each transducer in the array of transducers, the first reflected signals reflected from boundary objects defining a boundary of the selected area and from one or more tracking objects within the selected area;
  c) storing digital data corresponding to the first reflected signals in a memory associated with each transducers in the array of transducers generating stored digital data;
  d) generating second acoustic signals from each transducer in the array of transducers in response to time reversing a read out of the stored digital data;
  e) receiving second reflected signals in response to the second acoustic signals and generating second digital data;
  f) analyzing the second digital data and generating and storing a first signature pattern indicating relative locations of the boundary objects and the one or more tracking objects;
  g) transmitting the second acoustic signals at time intervals and generating a second signature pattern;

h) comparing a second signature pattern to the first signature pattern; and i) determining if a tracking object has moved from the selected area in response to the step of comparing the new signature pattern to the reference signature pattern.

2. The method of claim 1, wherein the boundary objects are shaped to reflect the first acoustic signals in a particular frequency range.

3. The method of claim 1, wherein the tracking objects incorporate a tag that is reflective to the first acoustic signals in a particular frequency range.

4. The method of claim 3, wherein the tag is removable or capable of being disabled after completion of a sale of a tracking object authorizing the tracking object to be moved outside an area defined by the boundary objects.

5. A method for determining if an object is removed from a selected area comprising the steps of:
   a) transmitting a first acoustic signal simultaneously from an array of transducers;
   b) receiving first reflected signals in each transducer in the array of transducers in response to a first reflected signal from boundary objects defining a boundary of the selected area and from one or more tracking objects within the selected area;
   c) storing digital data corresponding to the first reflected signals in a memory associated with each transducers in the array of transducers generating stored digital data;
   d) generating second acoustic signals from each transducer of the array of transducers in response to time reversing the stored digital data in each transducer of the array of transducers;
   e) receiving an identification signal generated by the one or more tracking object in response to the one or more tracking objects receiving a second acoustic signal;
   f) repeating steps a)–d) if a tracking object does not generate an identification signal; and
   g) generating an alarm signal if a tracking object continues to not generate an identification signal after step f).

6. The method of claim 5, wherein each of the boundary objects has a transmitter that is stimulated to transmit an identification signal when the boundary object receives a second signal of greater than a predetermined level.

7. The method of claim 5, wherein one or more tracking objects have a transmitter that is stimulated to transmit an identification signal when the tracking object receives a second signal of greater than a predetermined level.

8. The method of claim 7, further comprising the step of regenerating the reference pattern in response to determining that a tracking object did not transmit an identification signal in response to broadcast of the second signals.

9. A system for determining if a tracking object is removed from a selected area comprising:
   an array of transducers distributed in proximity to the selected area, wherein each transducer in the array of transducers generates output acoustic energy in response to an electrical input signal and generates an electrical output signal in response to received input acoustic energy;
   a multiplicity of boundary objects defining the selected area, wherein each of the boundary objects has features for selectively reflecting acoustic energy in a particular acoustic frequency band;
   signal processing circuitry coupled to the array of transducers for converting the electrical output signal from each transducer in the array of transducers into digital receive data and converting digital transmit data into the electrical input signal for each transducer in the array of transducers;
   a processor coupled to the signal processing circuitry for generating the digital transmit data and analyzing the digital receive data to determine signature patterns defining relative locations of the boundary objects and one or more tracking objects placed in the selected area, wherein the one or more tracking objects have features for selectively reflecting acoustic energy in a particular frequency band;
   compare circuitry coupled to the processor for comparing the signature patterns to a predetermined reference signature pattern defining desired relative locations of the boundary objects and the one or more tracking objects; and
   a memory system for storing the digital receive data and the reference signature pattern.

10. The system of claim 9, wherein the multiplicity of boundary objects and one or more tracking objects comprise transmitter circuitry for generating a first output acoustic signal in response to detecting a first input acoustic signal transmitted from the array of transducers.

11. The system of claim 10, wherein each of the multiplicity of boundary objects and one or more tracking objects generates an acoustic identification signal in response to receiving a second acoustic signal transmitted by the array of transducers.

12. The system of claim 11, wherein the second input acoustic signal is generated by time reversing digital data generated in response to the first output acoustic signal.

13. The system of claim 12, wherein the acoustic identification signal is generated if a level of the second acoustic signal received by a boundary object or a tracking object exceeds a predetermined value.

14. The system of claim 12, wherein the first acoustic signal is simultaneously transmitted by the array of transducers if one or more of the tracking objects fails to generate an identification signal in response to transmission of the second acoustic signal.

15. The system of claim 9, wherein the boundary objects have features to reflect the first signals in a particular frequency range.

16. The system of claim 13, wherein the one or more tracking objects each incorporate a tag that is reflective to the first signals in a particular frequency range.

17. The system of claim 14, wherein tag is removable after completion of a sale of a tracking object.

18. The system of claim 9, wherein the memory system is coupled to the processor and comprises a memory array coupled to a memory controller, the memory controller for controlling read and write operations to the memory array.

19. A method of locating an object comprising:
   a) transmitting a first acoustic signal;
   b) receiving first reflected signals comprising first acoustic signal energy reflected from the object;
   c) transmitting a second acoustic signal comprising a time-reversed version of said first reflected signal;
   d) receiving second reflected signals comprising second acoustic signal energy reflected from the object;
   e) storing said second reflected signals as a first signature signal indicating the location of the object;
   f) periodically transmitting said second acoustic signal;
   g) receiving third reflected signals comprising acoustic signal energy reflected from the object as a result of each said periodic transmission;
   h) storing each said third reflected signals as a second signature signal indicating the location of the object; and
   i) comparing said second signature signal to said first signature signal to determine if the object has moved.

* * * * *